Dec. 13, 1938.   H. L. TOWNS ET AL   2,139,986
CONTROL OF GEARING FOR DRIVING SUPERCHARGERS ON AIRCRAFT ENGINES
Filed Sept. 21, 1937
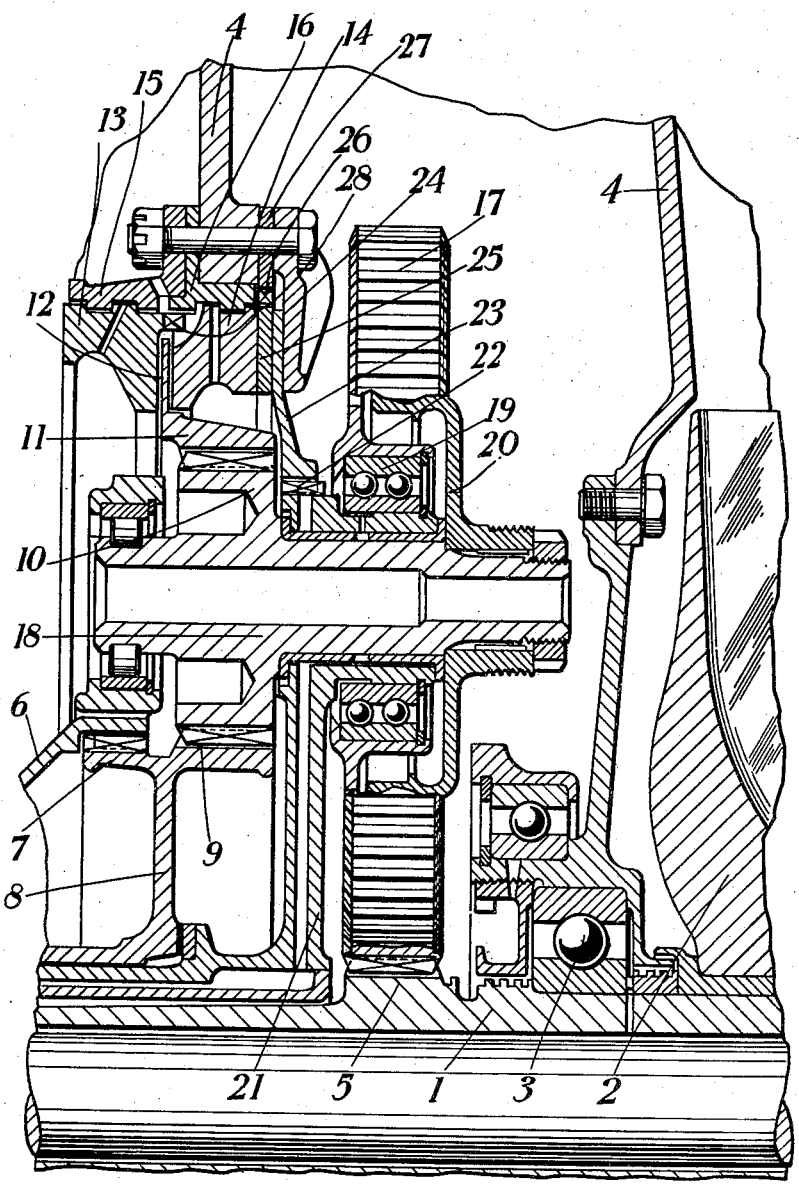
Inventors
Herbert L. Towns
and Gerard M. Cutler
by Mawhinney & Mawhinney
Attorneys.

Patented Dec. 13, 1938

2,139,986

UNITED STATES PATENT OFFICE 2,139,986

CONTROL OF GEARING FOR DRIVING SUPERCHARGERS ON AIRCRAFT ENGINES

Herbert Langley Towns and Gerard Mervyn Cutler, Coventry, England, assignors to Armstrong Siddeley Motors Limited, Coventry, England Application September 21, 1937, Serial No. 164,994
In Great Britain July 28, 1937

4 Claims. (Cl. 74—273)

This invention relates to the control of change-speed gearing, particularly for use in driving a supercharger of an aircraft engine, of the kind protected by patent application No. 108,868 now Patent No. 2,099,675.

In the example illustrated in the drawings of this prior specification, where the change-speed gearing is a planetary one of which the carrier can be held to give a relatively large speed increase, the "high speed element" (this term being hereinafter applied to that element which, when held, provides the said large speed increase) is the one which can be braked or released by the rotation of the two control members which are on opposite sides of the "high speed element" and have screw-threaded connections of opposite sense, respectively, with a stationary part. The other of the elements, a reaction ring in mesh with the planet-gear means, hereinafter referred to as the "low speed element", is that element which when held provides a relatively small speed increase.

Our present object is to adapt the gearing and the control means therefor so that advantage can be taken of the leverage of the control members to apply the larger force for holding the element which requires the largest torque.

According to the invention, the change-speed gearing has the "low speed element" arranged between and so that it can be braked or released by the rotation of the two control members, whilst one of the latter serves for simultaneously releasing or braking, respectively, the "high speed element".

A further feature of the invention consists in arranging that the "low speed element" when being braked shall rotate in the direction in which the control members are rotated to brake it, whereby the self-wrapping action of the control members is of value in increasing the braking effort.

The single figure of the accompanying drawing is a sectional elevation of approximately half of one form of change-speed gearing, for use in the drive to the superchanger of an aircraft engine, having control means according to the invention.

The drawing shows a driven shaft 1 on which is secured a superchanger impeller 2, the shaft being journalled through ball bearings 3 in a stationary casing 4 and having fast on it a driven pinion 5. The drive is taken from the engine crankshaft to a sleeve 6, coaxial with the driven shaft 1, which is internally toothed to engage one set of teeth 7 of a gear 8. The other set of teeth 9 thereof is meshed with a planet-gear means.

The latter includes a gear 10 in mesh with the "low speed element" 11 which is an internally-toothed reaction ring formed with a radially-extending flange 12 which can be frictionally gripped between rotatable control members 13, 14 having peripheral screw-threads of opposite sense engaged, respectively, with corresponding screw-threads formed on stationary parts 15, 16 bolted to the stationary casing 4. The planet-gear means also includes a gear 17 in mesh with the driven gear 5. In the present instance the gear 17 is journalled on the shaft 18 of the planet-gear means through ball bearings 19, and fast on the shaft 18 is a hub portion 20 which is associated with the gear 17.

The carrier 21 for the planet-gear means is formed with peripheral teeth 22 in mesh with the "high speed element" 23 shown as an annulus disposed between the control member 14 and a stationary part 24 bolted to the stationary casing 4. Interposed between the "high speed element" 23 and the control member 14 is an annulus 25 which is slidably held at 26 against rotation to the stationary part 27 bolted to the stationary casing 4.

The two control members have a sliding driving connection, indicated at 28, to ensure rotation in unison. The manner in which they are to be rotated forms no part of the present invention.

With the various members in the positions shown in the drawing, the "high speed element" 23 is frictionally braked and is holding the carrier 21 against rotation. The gearing thus acts as a countershaft gearing giving one speed increase from the relatively large gear 8 to the relatively small gear 10 and a further speed increase from the relatively large gear 17 to the relatively small gear 5, the overall gear ratio being in the neighbourhood of eight to one, i. e., the impeller will be driven at aproximately eight times the engine speed. Assuming the pitch of the screw-threaded connections between the control members 13, 14 and the associated stationary parts to give a leverage of six to one the leverage applied in these conditions for holding the "high speed element" 23 stationary is relatively large. If now the control members 13, 14 be rotated to free the "high speed element" 23 and to clamp the "low speed element" 12 the resultant leverage applied for holding the latter stationary is three to one—half that of the former case. When the "low speed element" 12 is held the planet gear 10 rolls round it providing an overall gear ratio of approximately five to one, i. e., the impeller in these conditions will be driven at about five times the engine speed.

Moreover, the arrangement is such that when the "low speed element" 12 is being braked it is rotating in the direction in which the control members 13, 14 are being rotated, so that as frictional engagement occurs its momentum will assist in effecting the rotation of these control members in the appropriate direction.

Thus, by means of the invention, the parts are so arranged that advantage can be taken of the leverage to apply the larger force for holding the element of the gearing which requires the largest torque, and vice versa.

What we claim as our invention and desire to secure by Letters Patent of the United States is:—

1. In a two-speed planetary gearing, particularly for use in driving a supercharger of an aircraft engine, a low-speed element which can be held or released according to whether a relatively small speed increase is required or not, a high-speed element which can be held or released according to whether a relatively large speed increase is desired or not, said high-speed element being spaced axially from said low-speed element, and control means for said elements comprising two control members arranged on opposite sides of said low-speed element, one of said control members being adjacent one side of said high-speed element, a stationary member disposed adjacent the other side thereof, means interconnecting said two control members for rotation in unison, and means providing screw-threaded connections of opposite sense, respectively, between said two control members and a stationary part, whereby rotation of said two control members in one direction will cause them jointly to effect gripping of said low-speed element while said high-speed element is released, whereas rotation in the other direction will cause them to free said low-speed element and will cause said one control member to effect gripping of said high-speed element, the pitch of the screw-threaded connection being such that rotation of said control members to grip said low-speed element is in the same direction as rotation of said low-speed element whereby the torque on said low-speed element will exert a gripping force on said control members.

2. A two-speed planetary gearing, particularly for use in driving a supercharger of an aircraft engine, comprising driving and driven gears, a planet gear means intermeshing said driving and driven gears, a carrier for said planet gear means, a low-speed reaction ring having toothed engagement with said planet gear means, a high-speed reaction ring having toothed engagement with said carrier, said high-speed ring being spaced axially from said low-speed ring, and control means for said rings comprising two control rings arranged on opposite sides of said low-speed ring, one of said control rings being adjacent one side of said high-speed ring, a stationary member disposed adjacent the other side thereof, means interconnecting said two control rings for rotation in unison, and means providing screw-threaded connections of opposite sense, respectively, between said two control rings and a stationary part, whereby rotation of said two control rings in one direction will cause them jointly to effect gripping of said low-speed ring while said high-speed ring is released, whereas rotation in the other direction will cause them to free said low-speed ring and will cause said one control ring to effect gripping of said high-speed ring, the pitch of the screw-threaded connection being such that rotation of said control members to grip said low-speed element is in the same direction as rotation of said low-speed element whereby the torque on said low-speed element will exert a gripping force on said control members.

3. In a two-speed planetary gearing, particularly for use in driving a supercharger of an aircraft engine, a low-speed element which can be held or released according to whether a relatively small speed increase is required or not, a high-speed element which can be held or released according to whether a relatively large speed increase is desired or not, said high-speed element being spaced axially from said low-speed element, and control means for said elements comprising two control members arranged on opposite sides of said low-speed element, one of said control members being adjacent one side of said high-speed element, a stationary member disposed adjacent the other side thereof, means interconnecting said two control members for rotation in unison, and means providing screw-threaded connections of opposite sense, respectively, between said two control members and a stationary part, whereby rotation of said two control members in the direction in which said low-speed element can rotate will cause them jointly to effect gripping of said low-speed element while said high-speed element is released, whereas rotation in the other direction will cause them to free said low-speed element and will cause said one control member to effect gripping of said high-speed element, the pitch of the screw-threaded connection being such that rotation of said control members to grip said low-speed element is in the same direction as rotation of said low-speed element whereby the torque on said low-speed element will exert a gripping force on said control members.

4. In a two-speed planetary gearing, particularly for use in driving a supercharger of an aircraft engine, a low-speed element which can be held or released according to whether a relatively small speed increase is required or not, and control means for said element comprising two control members arranged on opposite sides of said element, means interconnecting said two control members for rotation in unison, a stationary enclosing part, and means providing screw-threaded connections of opposite sense, respectively, between the external peripheries of said two control members and said stationary part, said screw-threaded connections being such that rotation of said two control members in the direction in which said element can rotate will cause them jointly to effect gripping of said element.

HERBERT LANGLEY TOWNS.
GERARD MERVYN CUTLER.